United States Patent [19]

Hamill et al.

[11] 3,856,940

[45] Dec. 24, 1974

[54] RUMINANT FEED UTILIZATION IMPROVEMENT

[75] Inventors: Robert L. Hamill, New Ross; Marvin M. Hoehn, Indianapolis, both of Ind.

[73] Assignee: Eli Lilly and Company, Indianapolis, Ind.

[22] Filed: Sept. 27, 1972

[21] Appl. No.: 292,572

Related U.S. Application Data

[63] Continuation-in-part of Ser. No. 211,231, Dec. 23, 1971.

[52] U.S. Cl. .................................. 424/121, 424/122
[51] Int. Cl. ................................ A61k 21/00
[58] Field of Search ........................... 424/121, 122

[56] References Cited
OTHER PUBLICATIONS

Miller, The Pfizer Handbook of Microbial Metabolites, McGraw-Hill Book Co., Inc., N.Y., N.Y., 1961, pages 573 and 575.

*Primary Examiner*—Jerome D. Goldberg
*Attorney, Agent, or Firm*—Joseph A. Jones; Everet F. Smith

[57] ABSTRACT

Antibiotics A28695A, A28695B, and their physiologically-acceptable salts improve the digestive efficiency of certain animals. Oral administration of the antibiotics to ruminant animals having a developed rumen function, and to animals which ferment fibrous vegetable matter in the cecum, changes the digestive fermentation to produce more propionates relative to the production of acetates.

13 Claims, 2 Drawing Figures

INFRARED ABSORPTION SPECTRUM OF ANTIBIOTIC A 28695 A SALT 3,856,940

RUMINANT FEED UTILIZATION IMPROVEMENT

CROSS-REFERENCE

This application is a continuation-in-part of our co-pending application Ser. No. 211,231 filed Dec. 23, 1971.

BACKGROUND OF THE INVENTION

For many years, the animal science industry has tried to increase the efficiency of feed utilization in animals. The ruminant animals are of particular economic importance, and so, necessarily, is the efficiency of the utilization of ruminants' feed.

In the course of investigating the efficiency of feed use, the mechanism by which ruminants digest and degrade the components of their feed to form molecules which can be metabolically utilized has been intensively studied. The mechanism of carbohydrate utilization is now well known. Microorganisms in the rumen of the animal ferment the carbohydrate to produce glucose and monosaccharides, and then degrade the monosaccharides to pyruvate compounds.

Pyruvate is then metabolized by microbiological processes to either 2-carbon or 3-carbon compounds, which may be either acids or acid derivatives. Two 2-carbon compounds may be combined thereafter, still in the rumen, to form a 4-carbon compound. Leng, "Formation and Production of Volatile Fatty Acids in the Rumen," *Physiology of Digestion and Metabolism in the Ruminant* (Phillipson et al. ed.), Oriel Press, pages 408–10.

It is to be understood that the rumen produces 2-carbon, 3-carbon, and 4-carbon compounds in the form of acids and salts and other derivatives of the acids. Since it is impossible to identify precisely what form the various compounds take, those compounds are referred to in the art respectively as acetates, propionates, and butyrates.

The animal can utilize butyrate, propionate, and acetate with differing degrees of efficiency. Utilization of those compounds, which are collectively known as volatile fatty acids (VFA), occurs after absorption from the gut of the animal. Butyrate is utilized most efficiently, and acetate the least efficiently. However, the relative efficiency of use of butyrate is partially negated by the inefficiency of the manufacture of butyrate, which must be made from acetate in the rumen.

The rumen manufactures acetates by the degradation of pyruvates. Thus, each molecule of acetate is accompanied by a molecule of methane, most of which is lost through eructation. Since a butyrate molecule is made from two acetate molecules, manufacture of the relatively efficiently used butyrate involves the loss of two molecules of methane per molecule of butyrate.

Therefore, the best efficiency of feed utilization by a ruminant is obtained by maximizing the production of propionate compounds in the rumen. Increasing production of butyrate compounds is also beneficial, although less beneficial than increasing propionates, because of the good efficiency of butyrate use. Increases in production of propionate or butyrate compounds are measured relative to the production of acetate compounds in the rumen. The efficiency of feed use can be accurately monitored by observing the production and concentration of propionates and butyrates, relative to acetates, in the rumen. If the animal is making more propionates or butyrates and less acetates, it will be found to be using its feed more efficiently.

The relative efficiency of utilization of the VFA's is discussed by McCullough, *Feedstuffs*, June 19, 1971, page 19; Eskeland et al., *J. Anim. Sci.* 33, 282 (1971); and Church et al., *Digestive Physiology and Nutrition of Ruminants*, vol. 2 (1971), pages 622 and 625.

It has been well established that the efficiency of feed utilization by a ruminant animal can be readily determined by chemical analysis of the fermentation occurring in the rumen. For example, Marco et al., U.S. Pat. No. 3,293,038 taught the use of alkylated phenols as feed additives for improved feed efficiency. They illustrated an in vitro rumen fermentation test, and in vivo animal feeding studies, which were evaluated by chemical analysis of the rumen contents for acetate and propionate.

O'Connor et al., J. Anim. Sci. 30, 812–818 (1970), reported the results of in vitro rumen fermentation tests on a large number of compounds. German Pat. No. 2,059,407 reported the use of a hemiacetal of chloral and starch as a feed additive which inhibits the formation of methane and produces higher than normal levels of propionic and butyric acids.

Marco et al., U.S. Pat. No. 3,522,353 taught the use of halogenated acyclic carboxylic acids as feed additives. It was there shown that the compounds produced in vitro increases in propionate production, and also increased feed efficiency in animals fed those compounds. To a similar effect is Erwin et al., U.S. Pat. No. 3,564,098.

SUMMARY

We have discovered a novel method of increasing the production of propionates relative to acetates in the rumen of a ruminant animal having a developed rumen function. An antibiotic chosen from the group consisting of A28695A, A28695B, and their physiologically-acceptable salts is orally administered to the ruminant animal, whose feed efficiency is increased by the change in the chemistry of the rumen brought about by our method. We have also invented novel improved feed compositions which comprise feeds suitable for ruminant animals containing the above antibiotics, and novel improved feed premixes for the formulation of such feed compositions.

DESCRIPTION OF THE PREFERRED EMBODIMENT

Our invention is useful in ruminants which have a developed rumen function. Young ruminants, basically those still unweaned, function as monogastric animals. They use their simple liquid feeds just as monogastric animals do. As the young ruminants begin to eat solid feed containing cellulose, starch, and other carbohydrates, the function of the rumen begins to develop, and the microbiological population of the rumen begins to increase. After the animal has eaten solid feed for a time, its rumen function reaches its full development and continues to operate throughout the animal's life.

Our invention is functional in all of the ruminants, that is, the animals which have multiple stomachs, one of which is a rumen. The economically-important ruminant animals are cattle, sheep, and goats.

It is to be understood that the usefulness of our method is not limited to animals which are being fattened or to young growing animals. When our method is applied to adult animals, such as dairy cows or breeding stock, its benefit is seen as reduced feed consumption.

The animals must be administered a rumen-affecting amount of the antibiotic in order to gain the benefits of our method. The minimum rumen-affecting amount varies depending on the animals' diet, condition, and age. A satisfactory range of rates is from about 0.02 mg./kg./day to about 2.0 mg./kg./day. The preferred range is from about 0.05 mg./kg./day to about 1 mg./kg./day.

The antibiotics effective in our method are arbitrarily designated as A28695A and A28695B. They are produced along with other unidentified antibiotic substances by culturing the microorganism *Streptomyces albus* NRRL 3883 in an aqueous nutrient culture medium under submerged aerobic fermentation conditions until a substantial level of antibiotic activity is produced. Antibiotic factor A28695A is produced in greater abundance than is antibiotic A28695B.

The term A28695 is used in this specification and claims to include A28695A, A28695B, and their salts.

Antibiotic A28695A, as isolated from the A28695 mixture of antibiotics, is obtained as a white, crystalline mixed sodium-potassium salt having a melting point of 161°–165°C.

The mixed sodium-potassium salt of antibiotic A28695A is insoluble in water, slightly soluble in methanol, soluble in ether, and soluble in esters such as methyl acetate, ethyl acetate and the like; ketones such as acetone and methyl ethyl ketone; the halogenated hydrocarbons such as chloroform; and the aromatic hydrocarbons such as benzene and toluene. The specific optical rotation, $[\alpha]_D^{25}$, of the mixed sodium-potassium salt of antibiotic A28695 is + 14.07° (C=1, methanol).

Figure 1:
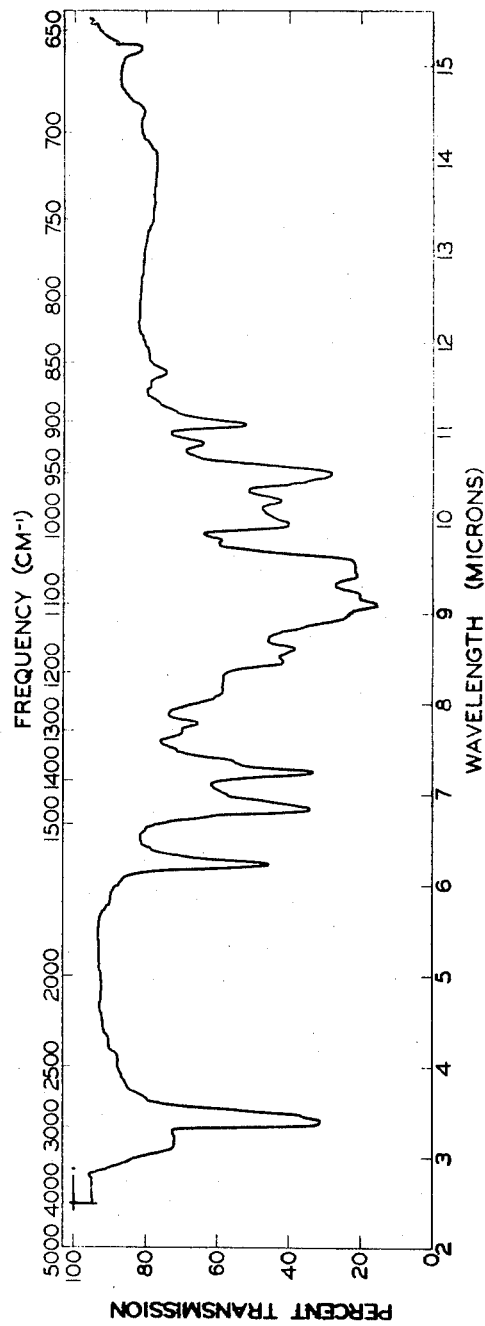

The infrared absorption spectrum of antibiotic A28695A as the mixed sodium-potassium salt in chloroform solution is shown in FIG. 1 of the accompanying drawings. The following distinguishable absorption maxima in the spectrum are observable over the range of 2.0 to 15.0 microns: 3.1–3.3, 3.4, 3.47, 6.24, 6.84, 7.00, 7.25, 7.37, 7.49, 7.68, 7.78, 8.1, 8.47, 8.61, 8.95, 9.11, 9.20, 9.42, 9.5, 9.80, 9.98, 10.24, 10.54, 10.87, 11.09, 11.5, and 11.66 microns. The antibiotic has no characteristic ultraviolet absorption pattern.

A powder X-ray diffraction pattern of the crystalline mixed sodium potassium salt of antibiotic A28695A using vanadium-filtered chromium radiation and a wave length value of 2.2896A for calculating the interplanar spacings gives the following values:

| d | I/I₁ |
|---|---|
| 18.23 | 1.00 |
| 14.75 | 1.00 |
| 13.26 | 0.40 |
| 12.05 | 0.60 |
| 9.53 | 0.40 |
| 9.01 | 0.50 |
| 8.27 | 0.30 |
| 8.02 | 0.30 |
| 7.61 | 0.30 |
| 7.36 | 0.50 |
| 6.93 | 0.02 |
| 6.69 | 0.60 |
| 6.02 | 0.40 |
| 5.92 | 0.30 |
| 5.59 | 0.10 |
| 5.43 | 0.40 |
| 5.24 | 0.10 |
| 5.09 | 0.20 |
| 4.94 | 0.40 |

-Continued

| d | I/I₁ |
|---|---|
| 4.76 | 0.05 |
| 4.57 | 0.10 |
| 4.35 | 0.05 |
| 4.16 | 0.02 |
| 4.09 | 0.10 |
| 3.98 | 0.05 |

The free acid of A28695A is a white crystalline solid melting at about 97°–99°C. Elemental analysis of the free acid form of antibiotic A28695A gives the following elemental composition: 63.31 percent carbon; 8.83 percent hydrogen and 28.03 percent oxygen. Mass spectral data on antibiotic A28695A indicate an approximate molecular weight of 834. Electrometric titration of the sodium salt of antibiotic A28695A in 66 percent aqueous ethanol shows the presence of one titratable group which has a pKa value of 5.51. The molecular weight of the sodium salt, as determined from the titration data, is approximately 874. The molecular weight of the free acid would therefore be approximately 852. This value is higher than the value from the mass spectral data. The value calculated from the mass spectral data is probably the more accurate, because of the limitations of the titration method. Nuclear magnetic resonance spectral data indicate the presence of four methoxy groups in antibiotic A28695A.

The mixed sodium-potassium salt of antibiotic A28695B is a white, crystalline compound melting at 170°–172°C. The solubility and stability pattern of the antibiotic is similar to that of the mixed sodium-potassium salt of antibiotic A28695A.

Figure 2:
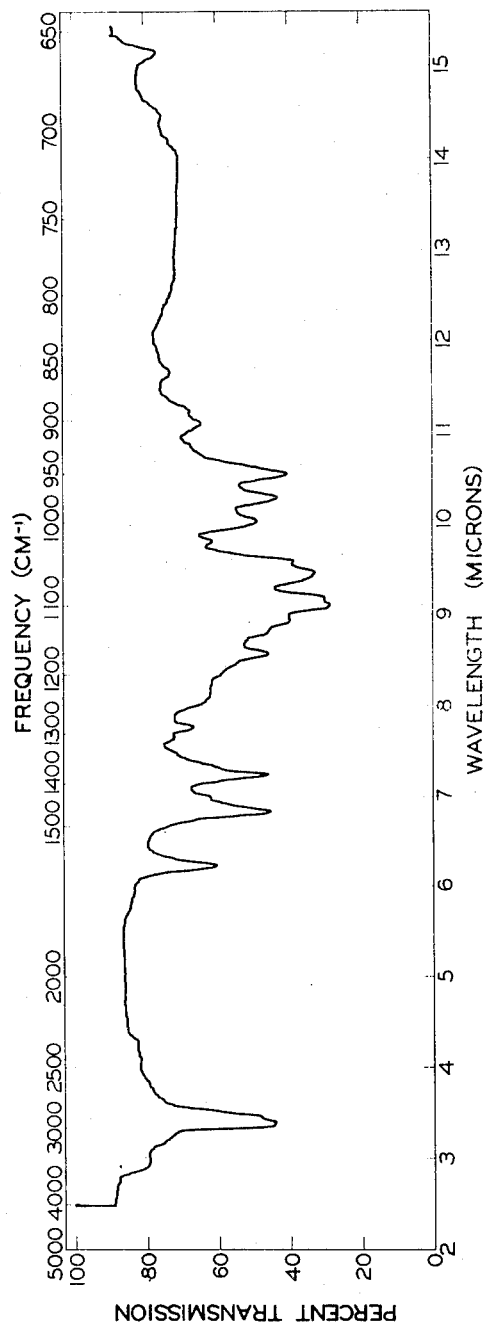

The infrared absorption spectrum of A28695B as the mixed sodium-potassium salt in chloroform solution is shown in FIG. 2 of the accompanying drawings. The distinguishable bands in the infrared spectrum over the range of 2.0 to 15.0 microns are as follows: 3.0, 3.4, 3.47, 6.24, 6.85, 7.01, 7.26, 7.3, 7.68, 7.78, 8.1, 8.58, 8.82, 8.95, 9.11, 9.19, 9.45, 9.59, 9.82, 10.04, 10.28, 10.55, 11.10, 11.24 and 11.65 microns.

The antibiotic has no characteristic ultraviolet absorption pattern.

The optical rotation, $[\alpha]_D^{25}$, of the mixed sodium-potassium salt of antibiotic A28695B is +10.1° (C=1, methanol).

The acid form of antibiotic A28695B is a white crystalline solid with a melting point of 122°–124°C. Microanalysis gives the following percent elemental composition of the acid form of A28695B: 60.49 percent carbon; 9.15 percent hydrogen and 31.32 percent oxygen. Nuclear magnetic resonance spectral data indicate that antibiotic A28695B contains three methoxy groups. Mass spectral data on antibiotic A28695B indicate an approximate molecular weight of 846. Electrometric titration of antibiotic A28695B as the sodium salt in 66 percent aqueous ethanol shows the presence of one titratable group having a pKa value of 5.9. The molecular weight of the sodium salt of antibiotic A28695B, calculated from the titration data, is approximately 877. The molecular weight of the free acid of antibiotic A28695B would therefore be approximately 855.

A powder X-ray diffraction pattern of the crystalline antibiotic A28695B acid using vanadium filtered chromium radiation and a wave length value of 2.2895 A for calculating interplanar spacings gives the following values:

| d | $I/I_1$ |
|---|---|
| 13.54 | .50 |
| 12.63 | .05 |
| 11.52 | .15 |
| 9.96 | .02 |
| 9.39 | .60 |
| 7.88 | .20 |
| 7.52 | .20 |
| 7.08 | .30 |
| 6.66 | 1.00 |
| 6.46 | .20 |
| 6.28 | .20 |
| 6.05 | .30 |
| 5.81 | .50 |
| 5.57 | .20 |
| 5.33 | .70 |
| 4.92 | .60 |
| 4.63 | .60 |
| 4.51 | .20 |
| 4.29 | .30 |
| 4.41 | .30 |
| 3.98 | .10 |
| 3.84 | .60 |
| 3.73 | .05 |
| 3.66 | .05 |
| 3.57 | .05 |
| 3.48 | .05 |
| 3.22 | .15 |
| 3.07 | .10 |
| 3.05 | .02 |
| 2.94 | .02 |
| 2.84 | .02 |
| 2.72 | .10 |
| 2.56 | .02 |
| 2.33 | .02 |
| 2.27 | .02 |
| 2.15 | .05 |
| 2.09 | .02 |
| 2.07 | .02 |
| 2.03 | .02 |

The paper chromatographic behavior of the mixed sodium and potassium salts of A28695A and B is shown by the RF values in Table I below. The values were obtained in the indicated solvent systems, using in each instance Whatman No. 1 paper. The location of the antibiotics on the chromatogram was determined by bioautograph using *Bacillus subtilis* as the detecting organism.

Table I

Paper chromatography of Antibiotics A28695A and A28695B

| Solvent System | Rf Value* A28695A | A28695B |
|---|---|---|
| Water saturated with butanol | 0.53 | 0.83 |
| Water saturated with butanol; 2% p-toluene sulfonic acid; 1% piperidine | 0.64 | 0.76 |
| Water saturated with methyl isobutylketone; 2% p-toluene sulfonic acid; 1% piperidine | 0.58 | 0.74 |
| Water:methanol:acetone (12:3:1)** | 0.25 | 0.54 |
| Benzene saturated with water | 0.57 | 0.48 |

*Rf value is defined as the ratio of the distance traveled by the antibiotic from the origin to the distance traveled by the solvent front from the origin.
**This solution is adjusted to pH 10.5 with NH$_4$OH and then the pH is lowered to pH 7.5 with H$_3$PO$_4$.

Thin-layer chromatography on silica gel plates with a vanillin spray as a detecting agent is also used to identify and separate antibiotic A28695A and B. The chromatographic behavior on silica gel is shown below.

Table II

Thin-layer chromatography of Antibiotics A28695A and A28695B

| Solvent System | Rf Value A28695A | A28695B |
|---|---|---|
| Benzene:ethyl acetate (1:1) | 0.71 | 0.61 |
| Chloroform:ethyl acetate (2:3) | 0.69 | 0.61 |
| Benzene:acetone (9:1) | 0.29 | 0.20 |

The acute toxicity of antibiotic A28695A in mice, expressed as $LD_{50}$, is about 41.1 mg./kg. of body weight when the antibiotic is administered orally. The $LD_{50}$ of antibiotic A28695B when administered orally to mice is about 43.5 mg./kg. body weight.

A characteristic property of the A28695 antibiotics is their ability to form complexes with monovalent cations. In experiments to determine ion specificity, antibiotic A28695A showed specificity for potassium ions and rubidium ions, while antibiotic A28695B showed specificity for sodium and potassium ions. The complexes formed by the A28695 antibiotics with monovalent cations are lipid soluble and will therefore facilitate the transport of ions across membranes.

The antibiotics of this invention are produced by culturing a strain of an actinomycete organism under submerged aerobic conditions in a nutrient culture medium until the culture medium contains substantial antibiotic activity. The antibiotics can be recovered from the fermentation medium by employing various isolation and purification procedures known in the art.

The actinomycete used in the production of the antibiotics of this invention has been identified as a strain of *Streptomyces albus* (Rossi-Doria) Waksman and Henrici. The organism has been deposited without restriction as to availability with the permanent culture collection of the Northern Utilization Research and Development Division, Agricultural Research Service, United States Department of Agriculture, Peoria, Ill. Its accession number in this collection is NRRL 3883.

The culture medium employable in producing antibiotics A28695A and B by cultivation of the above organism can be any one of several media, since the organism is capable of utilizing different energy sources. However, for economy of production, maximum yield of antibiotic, and ease of isolation of the antibiotic, certain culture media containing relatively simple nutrient sources are preferable. For example, the media useful in the production of antibiotics A28695A and B include an assimilable source of carbon such as glucose, mannitol, fructose, soluble starch, dextrin, molasses, brown sugar and the like. Preferred sources of carbon are glucose and dextrin. Additionally, employable media include a source of assimilable nitrogen such as oatmeal, beef extract, hydrolyzed casein, corn steep liquor, yeast extract, soybean meal, peptones (meat or soy) and the like. Preferred sources of nitrogen are soybean meal and acid-hydrolyzed casein.

Mineral salts, for example those providing calcium, magnesium, sodium, potassium, cobalt, chloride, sulfate and carbonate ions, and a source of growth factors, such as yeast or yeast extract, can be incorporated into the media with beneficial results.

As with many microorganisms, it is believed to be desirable to include the so-called "trace elements" in the culture medium for growing the actinomycete NRRL 3883. Such trace elements are commonly supplied as impurities incidental to the addition of the other constituents of the medium.

Production of A28695 can be effected at any temperature conducive to satisfactory growth of the microorganism, for example, between about 26°C. and 40°C. and preferably between about 26°–30°C. Ordinarily, optimum production of the antibiotics is obtained in about 2 to 5 days.

The initial pH of the culture medium can be varied widely. However, it has been found desirable that the initial pH of the medium be between 6.5 and 7.2. As has been observed with other actinomycetes, the pH of the medium gradually increases throughout the growth period of the organism and may attain a level from about 7.0 to about 8.0 or above, the final pH being dependent at least in part on the initial pH of the medium, the buffers present in the medium, and the period of time the organism is permitted to grow. Small quantities of the antibiotic are obtained conveniently by shake flasks and surface culture in bottles. For the production of substantial amounts of antibiotic A28695, however, submerged aerobic culture in large tanks is preferably employed.

In order to avoid a pronounced lag in the production of the antibiotic with the attendant inefficient utilization of equipment, it is preferred to use the vegetative rather than the spore form of the organism for inoculation of the medium in the production tanks. Accordingly, a vegetative inoculum of the organism is first prepared by inoculating a relatively small quantity of the culture medium with the spore form of the organism, and the young active vegetative inoculum so obtained is then transferred aseptically to the large production tanks. The medium in which the vegetative inoculum is produced can be the same as that utilized for the production of the antibiotic, although other media can be employed advantageously.

As is customary in submerged aerobic culture processes, sterile air is blown through the culture medium. For efficient growth of the organism and antibiotic production, the volume of air employed in the tank production of antibiotics A28695A and A28695B is preferably upwards of 0.1 volume of air per minute per volume of culture medium. Efficient growth and optimal yields of antibiotics A28695A and A28695B are obtained when the volume of air used is at least three tenths volume of air per minute per volume of culture medium.

The concentration of antibiotic activity in the culture medium can be followed readily during the fermentation period by testing samples of the culture medium for their inhibitory activity against the growth of an organism known to be inhibited in the presence of antibiotics A28695A and A28695B. The use of the organism *Bacillus subtilis* has been found to be suitable for this purpose. The testing can be carried out by well-known turbidometric or disc plate assay methods.

A variety of procedures can be used in the isolation and purification of antibiotics A28695A and A28695B, for example, solvent extraction, use of adsorbents and chromatography columns. Solvent extraction procedures are preferred for commercial production inasmuch as they are less time consuming and less expensive, and higher recovery yields are obtained thereby.

The antibiotic activity is located in the mycelium as well as in the fermentation beer. The mycelium can be separated from the fermentation beer by filtration with the use of a filter aid and both the mycelial cake and the filtered fermentation medium extracted with a suitable organic solvent to recover the A28695 activity. Alternatively, the unfiltered fermentation beer can be extracted with an organic solvent to recover the antibiotic activity. Suitable extraction solvents include, for example, ethyl acetate, amyl acetate, butanol, pentanol, or chloroform. The antibiotic extracts are evaporated under reduced pressure to obtain an impure mixture of the A28695 antibiotics as an oily residue. The antibiotics thus recovered are present in the form of their mixed sodium-potassium salts. Further purification of the antibiotic mixture can be accomplished by chromatography of the oily residue over a suitable adsorbent such as activated carbon or silica gel. An activated carbon adsorbent such as Pittsburgh Carbon is a preferred adsorbent for purifying the A28695 antibiotic mixture.

The individual antibiotics can be separated from the mixture by further chromatography. Thus, for example, the mixture of the sodium-potassium salts of A28695A and B can be dissolved in a solvent system consisting of benzene:ethyl acetate (9:1) and the solution so obtained chromatographed on a column packed with silica gel. The column is then eluted with the same solvent mixture and multiple fractions are collected. The progress of the fractionation is monitored by examining the individual fractions on thin-layer chromatograms or paper chromatograms. The fractions containing each individual antibiotic are combined and the solvent is removed by evaporation to yield in substantially pure form the separated antibiotics in the form of their mixed sodium-potassium salts.

The following examples illustrate the production of A28695.

EXAMPLE 1

Shake-flask fermentation of A28695

The A28695-producing culture is prepared and maintained on an agar slant having the following composition:

| | |
|---|---|
| Dextrin 700* | 10.0 g |
| N-Z amine A** | 2.0 g |
| beef extract | 1.0 g |
| yeast extract | 1.0 g |
| agar | 20.0 g |
| deionized water | 1 liter |

\* potato dextrin imported from Holland
\*\* Sheffield Chemical Co., Division of National Dairy Products Corp., Norwich, N.Y.

The slant is inoculated with the A28695 producing culture, NRRL 3883, and incubated at 30°C. for 4–6 days. The sporulated slant is covered with a small amount of sterile deionized water and gently scraped to provide an aqueous spore suspension.

One milliliter of the resulting spore suspension is used to inoculate 100 ml. of sterile vegetative medium having the following composition:

| | |
|---|---|
| glucose | 15.0 g |
| soybean meal | 15.0 g |
| corn steep solids | 5.0 g |
| $CaCO_3$ | 2.0 g |
| NaCl | 5.0 g |
| tap water | 1 liter |

The inoculated vegetative medium is incubated for 24–48 hours at 30°C. on a reciprocal shaker having a 2 inch stroke operating at 108 strokes per minute. A 5 ml. portion of the resulting culture is then employed to inoculate 100 ml. of sterilized production medium contained in a 500 ml. Erlenmeyer flask and having the following composition:

| | |
|---|---|
| soybean meal | 15.0 g |
| casein | 1.0 g |
| NaNO₃ | 3.0 g |
| glucose syrup | 20.0 g |
| tap water | 1 liter |

The inoculated medium is allowed to ferment for 42–72 hours at 25°–30°C. on a rotary shaker operating at 250 r.p.m. The observed terminal pH is about 7.0.

EXAMPLE 2

Tank fermentation of A28695

The A28695 producing culture is prepared and maintained on an agar slant having the following composition:

| | |
|---|---|
| dextrin | 10.0 g |
| yeast extract | 1.0 g |
| enzyme-hydrolyzed casein | 2.0 g |
| beef extract | 1.0 g |
| CoCl₂.6H₂O | 0.01 g |
| agar | 20.0 g |
| deionized water | 1 liter |

The pH of the medium is adjusted to 7.0 with sodium hydroxide solution. After steam sterilization, by autoclaving at 15–20 pounds pressure for thirty minutes, the pH of the medium is pH 6.9.

The slant is inoculated with the A28695-producing culture, NRRL 3883, and incubated at 30°C. for 10 days. The sporulated slant is covered with a small amount of sterile deionized water and gently scraped to provide an aqueous spore suspension.

Each slant is used to inoculate six 250 ml. flasks containing 50 ml. each of sterile vegetative culture medium having the following composition:

| | |
|---|---|
| glucose | 15.0 g |
| soybean grits | 15.0 g |
| corn steep liquor | 10.0 g |
| NaCl | 5.0 g |
| CaCO₃ | 2.0 g |
| tap water | 1.1 liters |

The pH of the medium is adjusted to 6.5 with sodium hydroxide solution and is unchanged by sterilization by autoclaving at 15–20 pounds pressure for 30 minutes.

The inoculated medium is allowed to ferment for 72 hours at 30°C. on a rotary shaker operating at 250 r.p.m. A 10 ml. portion of the resulting culture is used to inoculate 200 ml. of sterilized second-stage growth medium contained in a liter flask and having the same composition described above.

The inoculated medium is allowed to ferment for 30 hours at 30°C. on a reciprocal shaker operating at 250 r.p.m. A 200 ml. portion of the resulting culture is used to inoculate 25 liters of the following medium in a 40 liter fermentor:

| Ingredient | Percent |
|---|---|
| glucose | 2.5 |
| soybean grits | 1.5 |
| acid-hydrolyzed casein | 0.1 |
| molasses | 0.3 |
| CaCO₃ | 0.25 |
| tap water | 95.35 |

The pH of the medium is 7.2 after sterilization by autoclaving at 15–20 pounds pressure for 30 minutes.

The inoculated medium is aerated at a rate of three-tenths volume of air per volume of culture per minute and is stirred with conventional agitators at 350 r.p.m. The fermentation is carried out at 30°C. for 5 days.

EXAMPLE 3

Isolation of Antibiotic Mixture

Ninety-two liters of whole fermentation broth obtained from an A28695 fermentation is filtered with the aid of a commercial filter aid. The mycelial cake is suspended in 25 liters of methanol, and the mixture is stirred vigorously for 30–60 minutes. The mixture is filtered, and the filtrate is concentrated to remove the methanol. The aqueous phase so obtained is combined with the filtrate from the original fermentation broth.

The extracted mycelial cake is then suspended in 25 liters of ethyl acetate and the suspension is stirred 30–60 minutes. The mixture is filtered, and the mycelial cake is discarded.

The filtered broth is then extracted twice with half volumes of ethyl acetate. The spent broth is discarded. The ethyl acetate extracts are combined with the ethyl acetate extract of the mycelial cake.

The pooled extracts are concentrated to an oily residue. The resulting oil is dissolved in one liter of chloroform. The chloroform solution is passed over a 5.5 cm × 100 cm column of Pittsburgh carbon (12 × 40 mesh) packed in chloroform. The column is washed with 20 liters of chloroform. The chloroform effluent and wash are combined and concentrated to a dry residue. Seventy and four tenths grams of A28695 activity is recovered.

EXAMPLE 4

Separation of Antibiotics A28695A and A28695B

Thirty grams of crude antibiotic mixture A28695 obtained according to the procedure described in the previous section is dissolved in a 9:1 mixture of benzene and ethyl acetate. The solution is passed over a 5.5 cm × 115 cm column of silica gel (Grace grade number 62, Davison Chemical, Baltimore, Md. 21226). The adsorbent has previously been washed with benzene:ethyl acetate (9:1). The column is washed with six liters of benzene:ethyl acetate (9:1) and the effluent and wash are discarded. The column is then eluted with a benzene:ethyl acetate solution (4:1). The eluate is collected in multiple fractions, antibiotic A28695A coming off the column in the early fractions, while antibiotic A28695B is collected in subsequent fractions. The identity of the antibiotic in the respective column fractions is determined by paper chromatography and thin-layer chromatography. The column fractions containing the same antibiotic are combined and evaporated in vacuo to yield the respective individual antibiotics in substantially pure form.

Antibiotic A28695A is crystallized by dissolving the amorphous antibiotic in warm ether. The antibiotic crystallizes as the mixed sodium-potassium salt with a melting point of about 163°–165°C. Yield: 11.8 grams.

Antibiotic A28695B is also crystallized from ether in the form of the mixed sodium-potassium salt with a melting point of about 170°–172°C. Yield: 5.3 grams.

EXAMPLE 5

Preparation of acid form of Antibiotic A28695A

Five grams of the mixed sodium-potassium salt of antibiotic A28695A is dissolved in 105 ml. of dioxane. Forty ml. of water is added to the solution. The pH of the solution is adjusted to 4 with hydrochloric acid. The solution is evaporated to remove the dioxane. The resulting aqueous solution is extracted twice with an equal volume of ethyl acetate and the spent aqueous phase is discarded. The ethyl acetate extracts are combined and concentrated to dryness. The dried residue is dissolved in warm ethyl ether. The ether solution is chilled overnight to allow antibiotic A28695A to crystallize. The crystals are recovered by filtration and dried. Yield: 4.5 g., m.p. about 97°–99°C.

EXAMPLE 6

Preparation of acid form of Antibiotic A28695B

One hundred mg. of A28695B as the mixed sodium-potassium salt is dissolved in 25 ml. of dioxane. Twenty ml. of water is added to the resulting solution and the pH is adjusted to 4.0 with hydrochloric acid. The solution is concentrated in vacuo in order to remove the dioxane. The resulting aqueous solution is extracted with an equal volume of ethyl acetate and the spent aqueous phase is discarded. The ethyl acetate extract is concentrated to dryness. The dried residue is dissolved in a minimum quantity of warm ethyl ether. The ether solution is held in the cold in order to allow crystallization of A28695B. The crystals are recovered by filtration and dried. Yield: 87 mg., m.p. about 122°–124°C.

A28695A and A28695B have the common property of organic acids of forming salts. Representatives of the inorganic bases forming physiologically-acceptable salts with the antibiotics include the alkali metal hydroxides such as lithium hydroxide, sodium hydroxide and potassium hydroxide; the alkali metal carbonates and bicarbonates such as lithium carbonate and sodium bicarbonate; the alkaline earth metal hydroxides and carbonates such as calcium hydroxide and magnesium carbonate; and like inorganic bases.

Illustrative of the organic bases forming physiologically-acceptable salts with the antibiotics are the primary, secondary and tertiary $C_1$–$C_4$ lower alkyl and lower hydroxyalkyl amines such as ethylamine, isopropylamine, diethylamine, methyl-n-butylamine, ethanolamine and diethanolamine.

The ammonium salts of A28695A and A28695B are prepared with ammonia or ammonium hydroxide.

The salts of the antibiotics are prepared according to procedures commonly employed for the preparation of cationic salts. For example, the free acid form of the antibiotic is dissolved in a suitable solvent, and an aqueous or organic solvent solution of the desired base is added to the antibiotic solution. The antibiotic cationic salts can be isolated by filtration and recrystallization or by evaporation of the solvent and purification by recrystallization.

The following examples illustrate the preparation of salts of A28695A and A28695B.

EXAMPLE 7

Preparation of the sodium salt of A28695A

Two hundred milligrams of A28695A acid, prepared according to the procedure described by Example 5, is dissolved in 10 ml. of acetone. To the solution is added with stirring 5 ml. of water and the pH of the solution is adjusted to 9.0 with 1N sodium hydroxide. The acetone is slowly evaporated by placing the solution under a stream of nitrogen. A precipitate forms which is recovered and dissolved in a minimum quantity of diethyl ether. The solution is evaporated to a small volume and chilled at 5°C. overnight. The resulting crystals are filtered and dried to yield 33 mg. of A28695A sodium salt melting at about 159°–160°C.

EXAMPLE 8

Preparation of A28695A ammonium salt

Two hundred milligrams of A28695A acid, prepared according to the procedure in Example 5, is dissolved in 10 ml. of acetone and 5 ml. of water is added to the solution. The pH of the solution is adjusted to 9.0 with concentrated ammonium hydroxide. The acetone is slowly evaporated by placing the solution under a stream of nitrogen. After the acetone has been evaporated from the solution, a noncrystalline precipitate forms. The suspension is extracted with an equal volume of diethyl ether and the resulting ether solution is concentrated to a small volume by placing the solution under a stream of nitrogen. The concentrated solution is allowed to stand at 5°C. overnight. A crystalline precipitate forms which is filtered and dried to yield 120 mg. melting at about 124°–125°C.

EXAMPLE 9

Preparation of the sodium salt of A28695B

Two hundrd milligrams of the acid form of A28695B, prepared according to the procedure described by Example 6, is dissolved in 10 ml. of acetone and 5 ml. of water is added slowly, with stirring, to the resulting solution. The pH of the solution is adjusted to 9.0 with 1N NaOH. The acetone is slowly evaporated by placing the solution under a stream of nitrogen. After the acetone has been evaporated from the solution a crystalline precipitate begins to form. The suspension is allowed to stand at 5°C. overnight in order for the crystallization to be complete. The crystals are filtered and dried to yield 150 mg. of A28695B sodium salt melting at about 161°–162°C.

EXAMPLE 10

Preparation of the ammonium salt of A28695B

Two hundred milligrams of A28695B free acid, prepared according to the procedure described by Example 6, is dissolved in 10 ml. of acetone and 5 ml. of water is added to the resulting solution slowly, with stirring. The pH of the solution is adjusted to 9.0 with concentrated ammonium hydroxide solution. The acetone is evaporated from the solution by placing the solution under a stream of nitrogen. A crystalline precipitate begins to form after the acetone has evaporated from the solution. The suspension is allowed to stand at 5°C. to complete the crystallization. The crystals of the ammonium salt of A28695B are recovered by filtration and dried to yield 138 mg. melting at about 124°–125°C.

It is well known in the veterinary pharmaceutical art that the salt form of an antibiotic is immaterial in the treatment of an animal with the antibiotic. Conditions within the animal frequently change the drug to chemical forms other than that in which it was administered. Therefore, the form, acid or salt, in which it may be administered is insignificant to the method of treatment and may be chosen for reasons of economics, convenience, and toxicity.

The effectiveness of our method of modifying the ratio of volatile fatty acids produced in the rumen was proven by means of scientific tests. The test method we used is shown below.

EXAMPLE 11

Rumen fluid is obtained from a steer which has a surgically-installed fistula opening into the rumen. The steer is maintained on a high-grain ratio, the composition of which follows:

| | |
|---|---|
| 69.95% | coarse ground corn |
| 10 % | ground corncobs |
| 8 % | soybean meal (50% protein) |
| 5 % | alfalfa meal |
| 5 % | molasses |
| 0.6 % | urea |
| 0.5 % | dicalcium phosphate |
| 0.5 % | calcium carbonate |
| 0.3 % | salt |
| 0.07% | Vitamin A and $D_2$ premix |
| 0.05% | Vitamin E premix |
| 0.03% | trace mineral premix |

A sample of rumen fluid is strained through 4 layers of cheesecloth and the eluate is collected in a vacuum bottle. The particulate matter retained by the cheesecloth is resuspended in enough physiological buffer to return it to the original volume of the rumen fluid, and the eluate is strained again. The buffer used is described below.

| | |
|---|---|
| 0.316 g./liter | $Na_2HPO_4$ |
| 0.152 g./liter | $KH_2PO_4$ |
| 2.260 g./liter | $NaHCO_3$ |
| 0.375 g./liter | KCl |
| 0.375 g./liter | NaCl |
| 0.112 g./liter | $MgSO_4$ |
| 0.038 g./liter | $CaCl_2$ |
| 0.008 g./liter | $FeSO_4 \cdot 7H_2O$ |
| 0.004 g./liter | $MnSO_4$ |
| 0.004 g./liter | $ZnSO_4 \cdot 7H_2O$ |
| 0.002 g./liter | $CuSO_4 \cdot 5H_2O$ |
| 0.001 g./liter | $CoCl_2$ |

Cheng et al., *J. Dairy Sci.* 38, 1225, (1955).

The two eluates are pooled in a separatory funnel and allowed to stand till particulate matter separates to the top. The clear layer is then diluted 1:1 with the same buffer, and adjusted to pH 7.0.

Ten ml. of the diluted rumen fluid is placed in a 25 ml. flask with 40 mg. of the same feed shown above. Five mg. of soybean protein is also added per flask. The compound to be tested is weighed into each test flask. Four replicate flasks are used per treatment.

Two sets of four untreated control flasks each are also prepared. One set of four flasks is incubated for 16 hours at 38°C. with the test flasks. The other set of four untreated control flasks are zero-time controls, into which 2 ml. of 25 percent metaphosphoric acid is added as soon as the flasks are prepared to stop the fermentation.

Fermentation in the incubated test and control flasks is stopped at the end of 16 hours by addition of 2 ml. of 25 percent metaphosphoric acid to each flask.

All of the samples are allowed to settle, and the supernatant is analyzed by gas chromatographic methods for acetate, propionate, and butyrate.

The analysis for each volatile fatty acid found in the zero-time controls is subtracted from the analyses in the untreated controls and in the test flasks. The resulting values reflect the amount of each VFA produced during the 16-hour fermentation period. The values obtained from the four replicate flasks on each treatment are averaged.

The data below is reported as the ratio of VFA's produced in treated flasks to VFA's produced in untreated control flasks. This method of reporting the data shows most clearly the results of the changes in the chemistry of the rumen brought about by our method of feed utilization improvement.

| Compound | Rate | Acetate | Propionate | Butyrate |
|---|---|---|---|---|
| A28695A mixed sodium-potassium salt | 25 mcg./ml. | 1.03 | 1.58 | 0.48 |
| | 10 | 0.87 | 1.58 | 0.65 |
| | 1.07 | 1.46 | 0.53 | |
| | 5 | 0.90 | 1.90 | 0.72 |
| | 1 | 1.07 | 1.30 | 0.64 |
| | 1 | 0.92 | 1.59 | 0.78 |
| | 1 | 0.90 | 1.34 | 1.00 |
| | 1 | 0.98 | 1.10 | 0.87 |
| | 1 | 0.96 | 1.23 | 0.82 |
| | 1 | 0.98 | 1.41 | 0.66 |
| | 1 | 0.85 | 1.32 | 0.88 |
| | 1 | 0.95 | 1.38 | 0.80 |
| | 0.50 | 0.97 | 1.07 | 0.96 |
| | 0.50 | 0.97 | 1.19 | 0.85 |
| | 0.50 | 1.04 | 1.28 | 0.68 |
| | 0.50 | 0.92 | 1.21 | 0.90 |
| | 0.25 | 0.96 | 1.15 | 0.99 |
| | 0.25 | 1.01 | 1.02 | 0.91 |
| | 0.25 | 0.86 | 1.29 | 0.94 |
| | 0.25 | 1.04 | 1.21 | 0.74 |
| | 0.25 | 1.02 | 1.05 | 0.94 |
| | 0.20 | 0.94 | 1.27 | 0.87 |
| A28695B mixed sodium-potassium salt | 25 | 1.21 | 1.18 | 0.61 |
| | 10 | 0.53 | 1.76 | 0.85 |
| | 5 | 1.14 | 1.27 | 0.65 |
| | 5 | 0.95 | 1.81 | 0.70 |
| | 1 | 1.23 | 1.05 | 0.67 |
| | 1 | 0.98 | 1.51 | 0.76 |
| | 0.2 | 0.98 | 1.17 | 0.88 |

The data above, where multiple tests have been performed at a given rate, can be pooled to produce the following mean results.

| Compound | Rate | Acetate | Propionate | Butyrate |
|---|---|---|---|---|
| A28695A mixed sodium-potassium salt | 5 mcg./ml. | 0.98 | 1.68 | 0.62 |
| | 1 | 0.95 | 1.33 | 0.81 |
| | 0.50 | 0.98 | 1.19 | 0.85 |
| | 0.25 | 0.98 | 1.14 | 0.90 |
| A28695B mixed sodium-potassium salt | 5 | 1.04 | 1.54 | 0.68 |
| | 1 | 1.10 | 1.28 | 0.72 |

The data above show that, in each individual test, the level of propionate was increased over the control value. In 19 of the 29 reported tests, the acetate level was reduced as compared to the untreated control. The increase in propionate relative to acetate is particularly noticeable in the pooled data tables, where the natural variability of biological data is smoothed out. Those tables show that treatment with A28695 at all rates utilized markedly increases propionate relative to acetate as compared with control values.

Butyrate levels are uniformly reduced relative to control values. As has been explained, since butyrate is made by the rumen from the inefficiently produced acetate, reduction in butyrate levels is not harmful to feed efficiency.

We have found that the antibiotic compounds of our method increase the production of propionates relative to production of acetates in ruminant animals when they are administered orally to the animals. The easiest way to administer the antibiotics is by mixing them in the animals' feed.

However, the antibiotic compounds can be usefully administered in other ways. For example, they can be incorporated into tablets, drenches, boluses, or capsules, and dosed to the animals. Formulation of the antibiotic compounds in such dosage forms can be accomplished by means of methods well known in the veterinary pharmaceutical art.

Capsules are readily produced by filling gelatin capsules with any desired form of the antibiotic. If desired, the antibiotic can be diluted with an inert powdered diluent, such as a sugar, starch, or purified crystalline cellulose in order to increase its volume for convenience in filling capsules.

Tablets of the antibiotics of our method are made by conventional pharmaceutical processes. Manufacture of tablets is a well-known and highly advanced art. In addition to the active ingredient, a tablet usually contains a base, a disintegrator, an absorbent, a binder, and a lubricant. Typical bases include lactose, fine icing sugar, sodium chloride, starch and mannitol. Starch is also a good disintegrator as is alginic acid. Surface-active agents such as sodium lauryl sulfate and dioctyl sodium sulphosuccinate are also sometimes used. Commonly-used absorbents again include starch and lactose while magnesium carbonate is also useful for oily substances. Frequently used binders are gelatin, gums, starch, dextrin and various cellulose derivatives. Among the commonly-used lubricants are magnesium stearate, talc, paraffin wax, various metallic soaps, and polyethylene glycol.

Our method can also be practiced by the administration of the antibiotic compound as a slow-pay-out bolus. Such boluses are made as tablets are made except that a means to delay the dissolution of the antibiotic is provided. Boluses are made to release for lengthy periods. The slow dissolution is assisted by choosing a highly water-insoluble form of the antibiotic. A substance such as iron filings is added to raise the density of the bolus and keep it static on the bottom of the rumen.

Dissolution of the antibiotic is delayed by use of a matrix of insoluble materials in which the drug is embedded. For example, substances such as vegetable waxes, purified mineral waxes, and water-insoluble polymeric materials are useful.

Drenches of our antibiotics are prepared most easily by choosing a water-soluble form of the antibiotic. If an insoluble form is desired for some reason, a suspension may be made. Alternatively, a drench may be formulated as a solution in a physiologically-acceptable solvent such as a polyethylene glycol.

Suspensions of insoluble forms of our antibiotics can be prepared in nonsolvents such as vegetable oils such as peanut, corn, or sesame oil; in a glycol such as propylene glycol or a polyethylene glycol; or in water, depending on the form of the antibiotic chosen.

Suitable physiologically-acceptable adjuvants are necessary in order to keep the antibiotic suspended. The adjuvants can be chosen from among the thickeners, such as carboxymethylcellulose, polyvinylpyrrolidone, gelatin, and the alginates. Many classes of surfactants serve to suspend antibiotics. For example, lecithin, alkylphenol polyethylene oxide adducts, naphthalenesulfonates, alkylbenzenesulfonates, and the polyoxyethylene sorbitan esters are useful for making suspensions in liquid nonsolvents.

In addition many substances which affect the hydrophilicity, density, and surface tension of the liquid can assist in making suspensions in individual cases. For example, silicone anti-foams, glycols, sorbitol, and sugars can be useful suspending agents.

The suspendable antibiotic may be offered to the grower as a suspension, or as a dry mixture of the antibiotic and adjuvants to be diluted before use.

Our antibiotics may also be administered in the drinking water of the ruminants. Incorporation into drinking water is performed by adding a water-soluble or water-suspendable form of the desired antibiotic to the water in the proper amount. Formulation of the antibiotic for addition to drinking water follows the same principles as formulation of drenches.

The greatest benefit of our method is obtained by continuous administration of A28695 to the animals. Therefore, the most practical way to administer it is in the form of our improved feed compositions containing A28695.

Our feed compositions are novel because of the presence of A28695; the animal feeds on which the compositions are based may be any feed suitable for the nutrition of ruminants having a developed rumen function.

The proper formulation of animal feeds which supply the nutritive needs of ruminant animals is an extremely well-known and sophisticated art. Those skilled in the art are experienced in the formulation of feeds which nourish the animals and which take advantage of the economic situation in the individual area, and they are well able to formulate feeds without further teaching. Such feeds, in general, comprise carbohydrates, proteins, roughage sources, and inorganic salts. In some instances, small amounts of growth-affecting substances such as vitamins and trace minerals are also added to the feed.

The following examples of ruminant animal feed formulations are given only in order to exemplify typical formulations.

Example 12
Lamb Fattening Ration, 45% Roughage

|  | % |
|---|---|
| corn, yellow | 39.00 |
| alfalfa hay | 45.00 |
| molasses, cane | 10.00 |
| soybean oil meal | 5.00 |
| dicalcium phosphate | 0.50 |
| salt | 0.35 |
| trace mineral and vitamin premixes | 0.15 |
|  | 100.00 |

Example 13

| Lamb Fattening Ration, 20% Roughage | |
| --- | --- |
| corn, yellow | 50.00 |
| beet, sugar, pulp | 15.00 |
| alfalfa hay | 20.00 |
| molasses, cane | 9.00 |
| soybean oil meal | 5.00 |
| dicalcium phosphate | 0.50 |
| salt | 0.35 |
| trace mineral and vitamin premixes | 0.15 |
| | 100.00 |

Example 14

| Cattle Growing or Wintering Ration, High Roughage | |
| --- | --- |
| corn silage, well eared, 50% dry matter | 68.00 (% of dry matter) |
| wheat, straw, ground | 20.00 |
| soybean oil meal | 10.00 |
| dicalcium phosphate | 0.75 |
| limestone, ground | 0.50 |
| salt | 0.50 |
| trace mineral and vitamin premixes | 0.25 |
| | 100.00 |

Example 15

| Cattle Fattening Ration, 10% Roughage | |
| --- | --- |
| barley | 76.00 |
| cottonseed hulls | 10.00 |
| cottonseed meal | 8.00 |
| animal fat | 4.00 |
| dicalcium phosphate | 0.50 |
| limestone, ground | 0.75 |
| salt | 0.50 |
| trace mineral and vitamin premixes | 0.25 |
| | 100.00 |

Our improved feed compositions contain at least a rumen-affecting concentration of A28695. A rumen-affecting concentration is that which provides a rumen-affecting dose to the animal when it consumes its regular daily ration of feed. The rumen-affecting concentration of course varies with the animal's weight and the amount of feed it consumes daily. Usually, the rumen-affecting concentration is within the range of from about 2 g. per ton of feed to about 200 g. of A28695 per ton of feed. The preferred range of A28695 concentrations is from about 5 g. per ton to about 100 g. per ton of feed. A28695 concentrations within these ranges provide generally effective rates of A28695 to the treated animals. Those skilled in the art will appreciate, however, that in special instances, such as when the animals to be treated are consuming exceptionally small or exceptionally large amounts of feed relative to their weight, concentrations outside our stated ranges may be appropriate.

The methods of formulating antibiotics into animal feeds are well known. It is usual to make a concentrated drug premix as a raw material for medicated feeds. The properties of the premix are submerged in the properties of the feed which is made from the premix. Therefore, the formulation of the premix is guided solely by convenience in making feed from the premix, and by economy. The nature of the active ingredient of the premix, and the biological action of the active ingredient, are irrelevant to premix formulation. The premix may contain from about 1 to about 400 g./lb. of A28695, depending on convenience in mixing feed containing the desired concentration of A28695. Premixes may be either liquid or solid.

Our improved feed premixes, which are novel because of the presence of our antibiotic A28695, are formulated in any of the conventionally-used, physiologically-acceptable carriers. Liquid carriers which are suitable for premix use include glycols such as polyethylene glycols of various molecular weights and propylene glycol, inert oils including vegetable oils and highly-refined mineral oils, and physiologically-acceptable alcohols such as ethanol. Water or aqueous alcohol is an effective liquid premix carrier for many of the forms of A28695. Solid premix carriers include vermiculite, diatomaceous earth, physiologically-acceptable clays such as attapulgite and montmorillonite, and granulated or powdered feed components such as cracked corn, soybean meal, alfalfa meal, rice hulls, corn cobs, cracked wheat and oats, and waste materials of grain processing.

All of the methods of formulating, mixing, and pelleting feeds which are normally used in the ruminant feed art are entirely appropriate for manufacturing feeds containing the antibiotic compounds of our method.

It is usual to treat economic animals, including ruminants, with a variety of growth promoters, disease-preventives, and disease treatments throughout their lives. Such drugs are often used in combination. Our method may be practiced in combination with other treatments.

As has been shown, oral administration of A28695 beneficially alters the production of propionates relative to the production of acetates in the rumen. The same treatment also benefits monogastric animals which ferment fibrous vegetable matter in the cecum. The monogastric animals here referred to are those which consume fibrous vegetable food and digest at least part of it by microbiological fermentation in the cecum. The cecal fermentation follows a chemical pathway similar to rumen fermentation.

Horses, swine, and rabbits are exemplary animals which digest a part of their food by cecal fermentation. The overall feed utilization of such animals is improved by the oral administration of A28695 by means of a beneficial change in the propionate/acetate ratio. Horses and rabbits are exemplary of animals in which cecal fermentation is a major part of the total digestive process, and in which A28695 is accordingly particularly beneficial.

We claim:

1. A method of increasing the digestive efficiency of a ruminant animal having a developed rumen function which comprises the oral administration to said animal of a rumen-affecting amount of an antibiotic selected from the group consisting of
    a. A28695A, which is a white crystalline compound melting at 97° to 99°C.; has an approximate molecular weight of 834 as determined by mass spectrometry; has the approximate elemental composition of 63.31% carbon, 8.83% hydrogen, and 28.03% oxygen; which in the form of its sodium salt has one titratable group having a pKa value of 5.51 as determined by electrometric titration in 66% aqueous ethanol; which in the form of its mixed sodium-potassium salt is a white crystalline compound melting at 161°–165°C.; which is insoluble in water, slightly soluble in methanol and is soluble in diethyl ether, ethyl acetate, acetone, chloroform and benzene; has a specific rotation $[\alpha]_D^{25} + 14.07°$ (C=1, methanol); which as a solution in chloroform has the following distinguishable bands in its infrared absorption spectrum: 3.1-3.3, 3.4, 3.47, 6.24, 6.84, 7.00, 7.25, 7.37, 7.49, 7.68, 7.78, 8.1, 8.47, 8.61, 8.95, 9.11, 9.20, 9.42, 9.5, 9.80, 9.98, 10.24, 10.54, 10.87, 11.09, 11.5 and 11.66 microns; and which shows no significant absorption in the ultraviolet region of the spectrum;

b. A28695B, which is a white crystalline compound melting at 122°-124°C.; has an approximate molecular weight of 846 as determined by mass spectrometry; has the approximate elemental composition of 60.49% carbon, 9.15% hydrogen, and 31.32% oxygen; which in the form of its sodium salt has one titratable group having a pKa value of 5.9 as determined by electrometric titration in 66% aqueous ethanol; which in the form of its mixed sodium-potassium salt is a white crystalline compound melting at 170-172°C.; which salt is insoluble in water, slightly soluble in methanol, soluble in diethyl ether, ethyl acetate, acetone, chloroform and benzene; has a specific rotation $[\alpha]_D^{25} + 10.1°$ (C=1, 95% aqueous ethanol); which as a solution in chloroform has the following distinguishable bands in its infrared spectrum: 3.0, 3.4, 3.47, 6.24, 6.85, 7.01, 7.26, 7.3, 7.68, 7.78, 8.1, 8.58, 8.82, 8.95, 9.11, 9.19, 9.45, 9.59, 9.82, 10.04, 10.28, 10.55, 11.10, 11.24 and 11.65 microns; and which has no significant absorption in the ultraviolet region of the spectrum; and c. the physiologically-acceptable salts thereof.

2. A method of claim 1 in which the antibiotic is administered at a rate from about 0.02 mg./kg./day to about 2 mg./kg./day.

3. A method of claim 2 in which the antibiotic is administered at a rate from about 0.05 mg./kg./day to about 1 mg./kg./day.

4. A method of claim 3 in which the antibiotic is the mixed sodium-potassium salt of A28695A, and a ruminant animal is cattle.

5. A method of claim 3 in which the antibiotic is the mixed sodium-potassium salt of A28695B, and a ruminant animal is cattle.

6. A feed composition suitable for the nutrition of ruminant animals having a developed rumen function which comprises a feed and a rumen-affecting concentration of an antibiotic selected from the group consisting of a. A28695A, which is a white crystalline compound melting at 97° to 99°C.; has an approximate molecular weight of 834 as determined by mass spectrometry; has the approximate elemental composition of 63.31% carbon, 8.83% hydrogen, and 28.03% oxygen; which in the form of its sodium salt has one titratable group having a pKa value of 5.51 as determined by electrometric titration in 66% aqueous ethanol; which in the form of its mixed sodium-potassium salt is a white crystalline compound melting at 161-165°C.; which is insoluble in water, slightly soluble in methanol and is soluble in diethyl ether, ethyl acetate, acetone, chloroform and benzene; has a specific rotation $[\alpha]_D^{25} + 14.07°$ (C=1, methanol); which as a solution in chloroform has the following distinguishable bands in its infrared absorption spectrum: 3.1-3.3, 3.4, 3.47, 6.24, 6.84, 7.00, 7.25, 7.37, 7.49, 7.68, 7.78, 8.1, 8.47, 8.61, 8.95, 9.11, 9.20, 9.42, 9.5, 9.80, 9.98, 10.24, 10.54, 10.87, 11.09, 11.5 and 11.66 microns; and which shows no significant absorption in the ultraviolet region of the spectrum;

b. A28695B, which is a white crystalline compound melting at 122°-124°C.; has an approximate molecular weight of 846 as determined by mass spectrometry; has the approximate elemental composition of 60.49% carbon, 9.15% hydrogen, and 31.32% oxygen; which in the form of its sodium salt has one titratable group having a pKa value of 5.9 as determined by electrometric titration in 66% aqueous ethanol; which in the form of its mixed sodium-potassium salt is a white crystalline compound melting at 170°-172°C.; which salt is insoluble in water, slightly soluble in methanol, soluble in diethyl ether, ethyl acetate, acetone, chloroform and benzene; has a specific rotation $[\alpha]_D^{25} + 10.1°$ (C=1, 95% aqueous ethanol); which as a solution in chloroform has the following distinguishable bands in its infrared spectrum: 3.0, 3.4, 3.47, 6.24, 6.85, 7.01, 7.26, 7.3, 7.68, 7.78, 8.1, 8.58, 8.82, 8.95, 9.11, 9.19, 9.45, 9.59, 9.82, 10.04, 10.28, 10.55, 11.10, 11.24 and 11.65 microns; and which has no significant absorption in the ultraviolet region of the spectrum; and c. the physiologically-acceptable salts thereof.

7. A feed composition of claim 6 in which the antibiotic is present at a rate from about 2 g. per ton to about 200 g. per ton of feed.

8. A feed composition of claim 7 in which the antibiotic is present at a rate from about 5 g. per ton to about 100 g. per ton of feed.

9. A feed composition of claim 8 in which the antibiotic is the mixed sodium-potassium salt of A28695A.

10. A feed composition of claim 8 in which the antibiotic is the mixed sodium-potassium salt of Aa28695B.

11. A feed premix which comprises a physiologically-acceptable carrier and from about 1 to about 400 g./lb. of an antibiotic selected from the group consisting of a. A28695A, which is a white crystalline compound melting at 97°-99°C.; has an approximate molecular weight of 834 as determined by mass spectrometry; has the approximate elemental composition of 63.31% carbon, 8.83% hydrogen, and 28.03% oxygen; which in the form of its sodium salt has one titratable group having a pKa value of 5.51 as determined by electrometric titration in 66% aqueous ethanol; which in the form of its mixed sodium-potassiumm salt is a white crystalline compound melting at 161°-165°C.; which is insoluble in water, slightly soluble in methanol and is soluble in diethyl ether, ethyl acetate, acetone, chloroform and benzene; has a specific rotation $[\alpha]_D^{25} + 14.07°$ (C=1, methanol); which as a solution in chloroform has the following distinguishable bands in its infrared absorption spectrum: 3.1-3.3, 3.4, 3.47, 6.24, 6.84, 7.00, 7.25, 7.37, 7.49, 7.68, 7.78, 8.1, 8.47, 8.61, 8.95, 9.11, 9.20, 9.42, 9.5, 9.80, 9.98, 10.24, 10.54, 10.87, 11.09, 11.5 and 11.66 microns; and which shows no significant absorption in the ultraviolet region of the spectrum;

b. A28695B, which is a white crystalline compound melting at 122°-124°C.; has an approximate molecular weight of 846 as determined by mass spectrometry; has the approximate elemental composition of 60.49% carbon, 9.15% hydrogen, and 31.32% oxygen; which in the form of its sodium salt has one titratable group having a pKa value of 5.9 as determined by electrometric titration in 66% aqueous ethanol; which in the form of its mixed sodium-potassium salt is a white crystalline compound melting at 170°–172°C.; which salt is insoluble in water, slightly soluble in methanol, soluble in diethyl ether, ethyl acetate, acetone, chloroform and benzene; has a specific rotation $[\alpha]_D^{25} + 10.1°$ (C=1, 95% aqueous ethanol); which as a solution in chloroform has the following distinguishable bands in its infrared spectrum: 3.0, 3.4, 3.47, 6.24, 6.85, 7.01, 7.26, 7.3, 7.68, 7.78, 8.1, 8.58, 8.82, 8.95, 9.11, 9.19, 9.45, 9.59, 9.82, 10.04, 10.28, 10.55, 11.10, 11.24 and 11.65 microns; and which has no significant absorption in the ultraviolet region of the spectrum; and c. the physiologically-acceptable salts thereof.

12. A feed premix of claim 11 in which the antibiotic is the mixed sodium-potassium salt of A28695A.

13. A feed premix of claim 11 in which the antibiotic is the mixed sodium-potassium salt of A28695B.

* * * * *

PO-1050
(5/69)

UNITED STATES PATENT OFFICE
CERTIFICATE OF CORRECTION

Patent No. 3,856,940          Dated December 24, 1974

Inventor(s) Hamill et al.

It is certified that error appears in the above-identified patent and that said Letters Patent are hereby corrected as shown below:

Column 5, line 20, "4.41" under heading "d" should read --4.14--.

Column 14, table between lines 22-45, the third line of the table which now reads "1.07, 1.46, 0.53" should read --5, 1.07, 1.46, 0.53--.

Column 20, line 39, "Aa28695B." should read --A28695B.--

Column 20, line 52, "potassiumm" should read --potassium--.

Signed and sealed this 4th day of March 1975.

(SEAL)
Attest:

RUTH C. MASON
Attesting Officer

C. MARSHALL DANN
Commissioner of Patents
and Trademarks